United States Patent [19]

Kubo et al.

[11] Patent Number: 4,901,185
[45] Date of Patent: Feb. 13, 1990

[54] MAGNETIC HEAD DEVICE USED WITH A RIGID MAGNETIC DISK PROVIDING A CONSTANT DISTANCE BETWEEN THE MAGNETIC DISK AND A MAGNETIC GAP OF THE MAGNETIC HEAD DEVICE

[75] Inventors: Masahiro Kubo; Yasuo Ohtsubo, both of Yokohama, Japan

[73] Assignee: Kabushiki Kaisha Toshiba, Kawasaki, Japan

[21] Appl. No.: 153,480

[22] Filed: Feb. 2, 1988

Related U.S. Application Data

[62] Division of Ser. No. 884,098, Jul. 10, 1986, abandoned.

[30] Foreign Application Priority Data

Jul. 19, 1985 [JP] Japan ................................ 60-159352
Jul. 19, 1985 [JP] Japan ................................ 60-159353

[51] Int. Cl.$^4$ ............................ G11B 5/48; G11B 5/60
[52] U.S. Cl. .................................. 360/104; 360/103; 360/105; 360/122
[58] Field of Search ............... 360/106, 102, 103, 104, 360/105, 122

[56] References Cited

U.S. PATENT DOCUMENTS

| | | | |
|---|---|---|---|
| 2,969,435 | 1/1961 | Lynott | 360/103 |
| 3,197,751 | 7/1965 | Felts | 360/103 |
| 3,397,289 | 8/1968 | Pfost et al. | 360/104 |
| 3,573,768 | 4/1971 | Harris | 360/103 |
| 3,676,874 | 7/1972 | Turner | 360/103 |
| 3,678,482 | 7/1972 | Billawala | 360/103 |
| 3,823,416 | 7/1974 | Warner | 360/122 |
| 4,130,847 | 12/1978 | Head et al. | 360/122 |
| 4,327,387 | 4/1982 | Plotto | 360/103 |
| 4,435,736 | 3/1984 | Herman | 360/103 |
| 4,644,431 | 2/1987 | Kishine et al. | 360/122 |
| 4,649,449 | 3/1987 | Sawada et al. | 360/125 X |
| 4,675,766 | 6/1987 | Schewe | 360/125 X |

FOREIGN PATENT DOCUMENTS

| | | | |
|---|---|---|---|
| 0122265 | 9/1980 | Japan | 360/103 |
| 58-64669 | 4/1983 | Japan | 360/104 |
| 58-177511 | 10/1983 | Japan | 360/122 X |
| 59-3743 | 1/1984 | Japan | 360/103 |
| 60-231967 | 11/1985 | Japan | 360/110 |
| 0250880 | 11/1986 | Japan | 360/103 |

OTHER PUBLICATIONS

McWhinney, "Trirail Slider with Low-Profile Center Rail", IBM Tech. Disc. Bull., vol. 20, No. 3, Aug. 1977.
Grometer et al, "Compliant Head Mounting", IBM Tech. Disc. Bull., vol. 5, No. 1, Jun. 1962.
Reich, "Multi-Core Magnetic Head", IBM Tech. Disc. Bull., vol. 13, No. 9, Feb. 1971.
IEEE Trans. on Magnetics, vol. Mag.-21, No. 5, "Transition on Perpendicular Rigid Disks in Quasi-Contact", C. J. Lin et al.

*Primary Examiner*—Robert S. Tupper
*Assistant Examiner*—Andrew L. Sniezek
*Attorney, Agent, or Firm*—Oblon, Spivak, McClelland, Maier & Neustadt

[57] ABSTRACT

A magnetic disk device includes a rigid magnetic disk having a magnetic recording surface, a slider located on one side of the magnetic recording surface of the magnetic disk and adapted to be radially movable on the magnetic disk, and a magnetic head. The slider includes a contact surface formed on a surface portion opposite the magnetic disk and adapted to contact the magnetic disk.

7 Claims, 7 Drawing Sheets

MAGNETIC HEAD DEVICE USED WITH A RIGID MAGNETIC DISK PROVIDING A CONSTANT DISTANCE BETWEEN THE MAGNETIC DISK AND A MAGNETIC GAP OF THE MAGNETIC HEAD DEVICE

This application is a division of application Ser. No. 884,098, filed on July 10, 1986, now abandoned.

BACKGROUND OF THE INVENTION

The present invention relates to a magnetic disk device and, more particularly, to a magnetic disk device using a hard disk.

Magnetic disk devices have been in widespread use and are popular as external storages. A magnetic disk device includes a magnetic disk, a motor for rotating the magnetic disk, a slider radially movable along the magnetic disk, and a magnetic head mounted on the slider to perform data read and write operations with respect to the magnetic disk.

In a prior art magnetic disk device using a hard disk, a magnetic head floats above the magnetic recording surface of the hard disk during data read/write accessing of the hard disk. More specifically, the slider for supporting the magnetic head thereon has a shape which generates an airflow between the slider and the hard disk. The slider connected to the magnetic head is subject to a dynamic pressure generated by an airflow such that the slider floats above the magnetic recording surface of the hard disk at a predetermined distance. For example, the slider receives a predetermined force from a means such as a spring element and is urged toward the hard disk. The slider, and hence the magnetic head, are located in a floating position where the biasing force of the spring is balanced with the slider's dynamic pressure generated by the airflow.

A large demand has arisen in recent years for a magnetic disk device which increases the recording density of the magnetic disk. In order to respond to this demand, a vertically magnetized recording system has been proposed. If this system is applied to the conventional magnetic disk device of a hard disk type, the distance between the magnetic recording surface of the hard disk and the magnetic head must be 0.1 $\mu$m or less. Variations in this distance must be minimized as much as possible.

Since the slider of the prior art magnetic disk device floats above the magnetic recording surface of the hard disk by means of the dynamic pressure of the airflow generated between the slider and the hard disk, the floating position of the slider, i.e., of the magnetic head, varies greatly in accordance with disturbances such as vibrations which act upon the magnetic disk device. It is, therefore, impossible under prior methods to reduce the distance between the magnetic head and the magnetic recording surface of a hard disk since variations in distance therebetween must be kept within the allowable range. As a result, even if a vertically magnetized recording method is used, the recording density cannot be sufficiently increased.

SUMMARY OF THE INVENTION

The present invention has been made in consideration of the above situation, and has as its object to provide a magnetic disk device wherein variations in the distance between the magnetic layer of the magnetic disk and the magnetic head can be minimized to increase the recording density of data recorded in the magnetic disk.

In order to achieve the above object of the present invention, there is provided a magnetic disk device, comprising:

a magnetic disk which is rotatably driven and at least one surface of which is defined as the magnetic recording surface;

a slider which is located on the magnetic recording surface and which is radially movable on the magnetic disk, the slider being provided with a contact portion adapted to contact the magnetic recording surface of the magnetic disk;

a magnetic head fixed on the slider, the magnetic head being provided with a magnetic gap with which the head performs data read and write operations on the magnetic recording surface of the magnetic disk; and a moving means for bringing the contact portion of the slider into contact with the magnetic recording surface of the magnetic disk at least while the magnetic disk is being rotated.

According to the magnetic disk device of the present invention, the contacting means can always bring the contact portion of the slider into contact with the magnetic recording surface of the magnetic disk during rotation of the magnetic disk, i.e., during operation of the device. The head distance between the magnetic gap in the magnetic head and the magnetic recording surface of the magnetic disk corresponds to the sum of the value representing the flatness of the magnetic recording surface and the distance between the contact portion of the slider and the magnetic gap in the magnetic head. This head distance is devoid of influence from noise, such as that caused by vibrations. According to state-of-the-art machining techniques, it is relatively easy to reduce the distance to 0.08 $\mu$m or less, and the value representing variances in the flatness of the magnetic recording surface to 0.02 $\mu$m or less. According to the magnetic disk device of the present invention, the head distance can be set to be 0.1 $\mu$m or less, which is required for performing vertically magnetized recording on the magnetic recording surface of a magnetic disk. In addition, variations in head distance can be minimized by contact of the slider directly with the magnetic disk. Therefore, by using a magnetic disk device of the present invention, data can be written on the magnetic recording surface of the magnetic disk at a high density. That is, the memory capacity of the magnetic disk can be increased significantly by performing vertically magnetized recording (high density recording) on the magnetic recording surface. In addition, data can be easily read from the magnetic recording surface of the magnetic disk.

If the magnetic head is located at a space apart from the contact portion of the slider by a predetermined distance in a direction away from the recording surface of the magnetic disk, the surface of the magnetic head is not brought directly into contact with the magnetic disk. Thus, the surface of the magnetic head is free from wear caused by contact with the magnetic disk, and is not damaged thereby. Therefore, the service life of the magnetic disk device can be prolonged. If the length of the contact portion contacting the magnetic disk is small and the magnetic head is located on the slider at trailing surface in view of the rotational direction of the magnetic disk, variations in head distance can be even further minimized.

Although, when the contact portion of the slider is in contact with the magnetic recording surface of the magnetic disk during the operation of a magnetic disk device the magnetic recording surface tends to be worn, however, according to the magnetic disk device of the present invention, in order to prevent wear of the magnetic recording surface, a lubricant is applied to the surface of the magnetic disk so that the slider's biasing force acting on the magnetic disk can be minimized as much as possible.

DETAILED DESCRIPTION OF THE PREFERRED EMBODIMENTS

Figure 1:
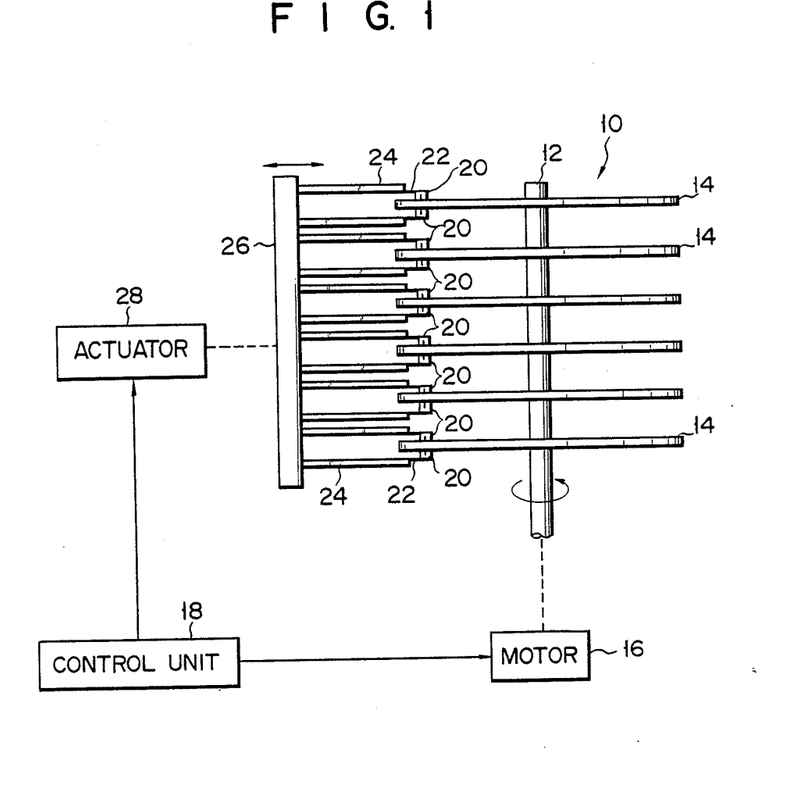
FIG. 1 is a schematic view of a magnetic disk device according to a first embodiment of the present invention.
Figure 2:
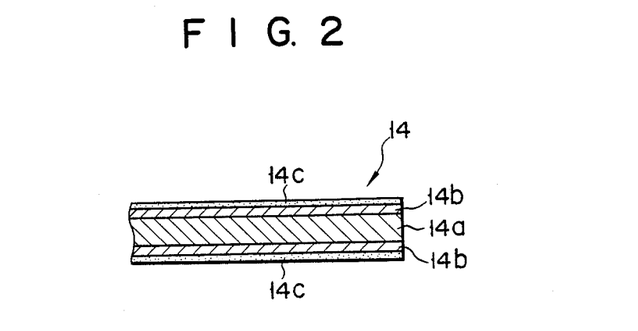
FIG. 2 is a sectional view showing part of a magnetic disk used in the device of FIG. 1.

FIG. 1 schematically shows a magnetic disk device utilizing a hard disk. The magnetic disk device comprises disk stack 10. Stack 10 includes spindle 12 and six magnetic disks 14 mounted on spindle 12. Disks 14 are equally spaced apart from each other along the axial direction of spindle 12. As shown in FIG. 2, each disk 14 comprises circular substrate 14a of a metal such as an aluminum alloy, perpendicular magnetic recording layers 14b formed on both surfaces of substrate 14a, and lubricant layers 14c respectively formed on layers 14b. Two lubricant layers 14c are formed by applying a lubricant to the corresponding recording layers 14b. However, a solid lubricant may be applied to recording layers 14b. The thickness of lubricant layers 14c will be described later. The upper magnetic recording layer 14b of the uppermost disk with respect to motor 16 (i.e., uppermost disk 14 in FIG. 1) is used to detect the angular positions of all six disks 14, and all other recording layers 14b of all disks 14 (including the lower layer of the uppermost disk) are used for data recording.

One end of spindle 12 is connected to motor 16. Thus, spindle 12 and disks 14 are rotated in synchronism with the rotation of motor 16. Motor 16 is electrically connected to control unit 18, which controls the rotational speed of motor 16.

A pair of head units 20 are located near both surfaces of each disk 14, so as to sandwich disk 14 therebetween. The magnetic disk device has a total of twelve head units 20. Units 20 are arranged on a line parallel to spindle 12.

Each head unit 20 is coupled to a common carriage 26 through gimbal arm 22 and access arm 24. Carriage 26 is coupled to actuator 28 driven by control unit 18, and is moved by actuator 28 in the directions o the arrow in FIG. 1. Motor 16 and actuator 28 are controlled by control unit 18 according to a known technique.

Figure 3:
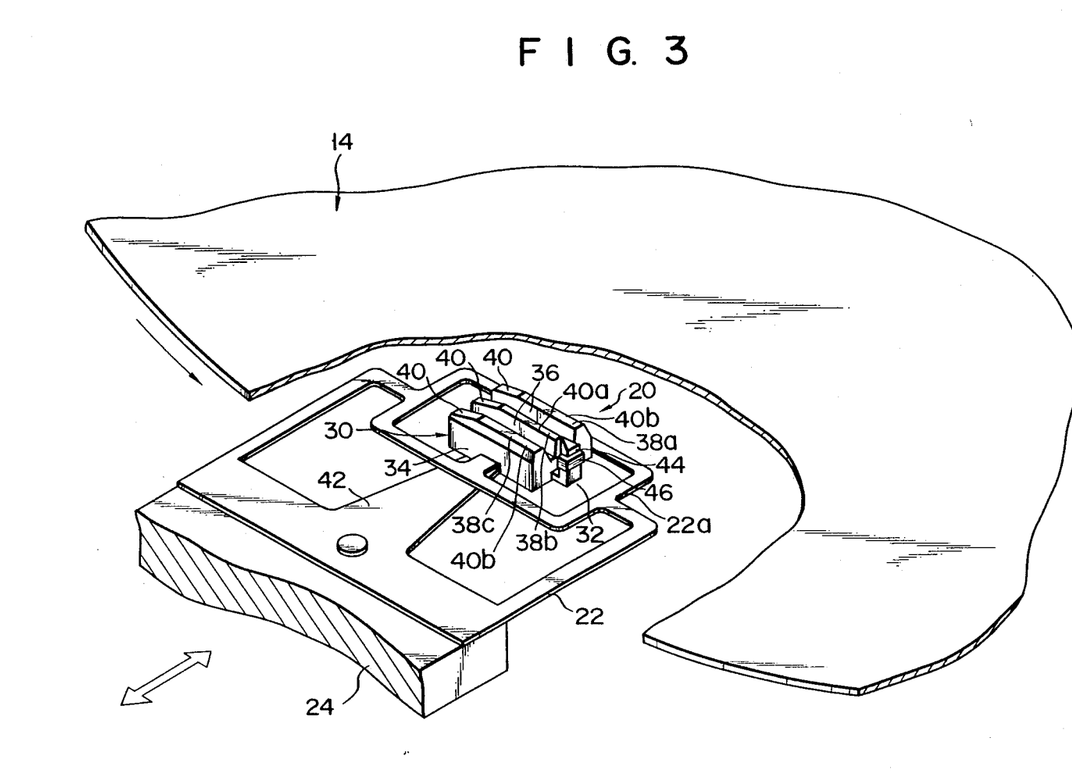
FIG. 3 is a perspective view showing a slider support mechanism in the device of FIG. 1.
Figure 4:
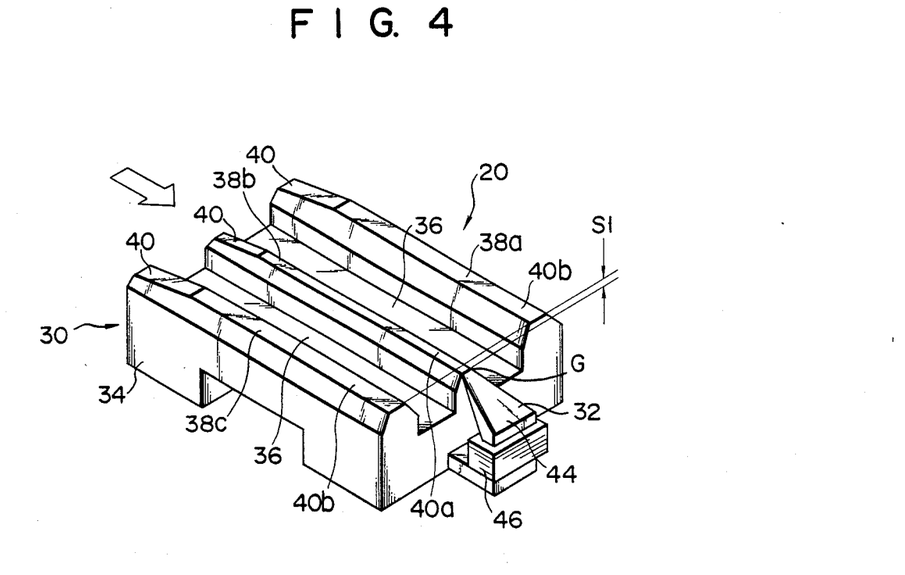
FIG. 4 is an enlarged perspective view of the slider in FIG. 3.

The head units 20 have an identical structure, which is best shown in FIGS. 3 and 4. Each head unit 20 comprises slider 30 and magnetic head 32. Slider 30 comprises rectangular parallelepiped block 34. Slider 30 is supported by gimbal spring 22a of gimbal arm 22 such that the longitudinal axis of block 34 is perpendicular to that of gimbal arm 22. Two parallel grooves 36 are formed on the surface of block 34 following the rotational direction of disk 14. These grooves 36 define three projections 38a, 38b, and 38c on the surface of block 34. These leading surfaces of projections 38a, 38b, and 38c when viewed in terms of the rotational direction of disk 14, include inclined surfaces 40. In this case, each surface 40 gradually angles away from the direction of disk 14 on the leading surface of block 34.

In terms of grooves 36, flat surface 40a of central projection 38b is shorter than the flat surfaces 40b of projections 38a and 38c by a distance S1 (FIGS. 4 and 5) of about 0.8 μm. In other words, flat surface 40a of projection 38b is located at a position farther from magnetic disk 14 than the positions of flat surfaces 40b of projections 38a and 38c by distance S1.

Leaf spring 42 is integrally formed with gimbal arm 22 to bring the flat surfaces 40b of slider 34 into contact with the magnetic recording surface of disk 14.

Magnetic head 32 is a vertically magnetic recording head mounted on the trailing surface of slider 30 in view of the rotational direction of disk 14. In this embodiment, magnetic head 32 includes a magnetic core (not shown) integrally embedded in the trailing surface projection 38b of slider 30, magnetic gap G thus defined within the magnetic core, yoke 44 fixed at the trailing side of slider 30 and being magnetically coupled to the magnetic core, ad coil 46 wound around yoke 44. It should be noted that gap G is located on the same plane as flat surface 40a of projection 38b of the slider 30. Whole magnetic head 32 may be embedded in slider 30.

The thickness of each of the lubricant layers 14c of disks 14 is greater than the maximum clearance necessary between the magnetic recording layer 14b and the slider 30, i.e., larger than the maximum clearance necessary between projections 38a and 38c and magnetic recording layer 14b when slider 30 is contacting the disk surface.

Figure 5:
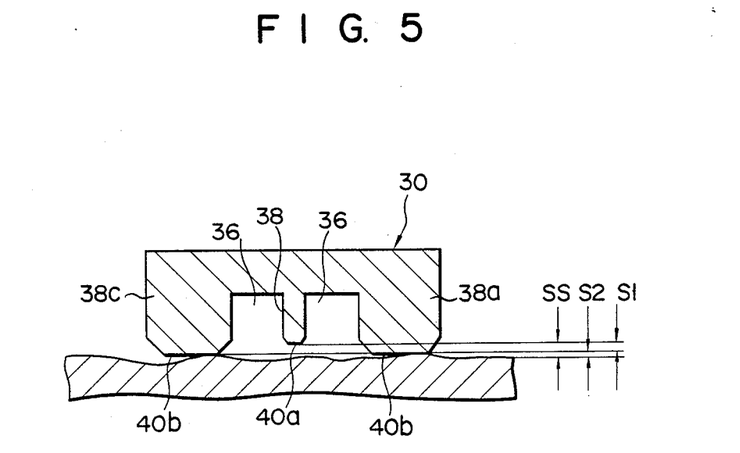
FIG. 5 is a sectional view of the slider in FIG. 4.

According to the magnetic disk device of the first embodiment, sliders 30 of the pair of head units 20 cooperated with each disk 14 are always in contact with corresponding magnetic recording layers 14b of the disk by the action of leaf springs 42 of gimbal arms 22, irrespective of rotation of disk 14. More specifically, the flat surfaces 40b of projections 38a and 38b of slider 30 are always in contact with magnetic recording layer 14b of the corresponding disk 14. Therefore, surfaces 40b of each slider 30 serve as contact surfaces relative to disk 14 while disk 14 is rotated. Magnetic gap G of the magnetic head 32 is located within the same plane as that of flat surface 40a of projection 38b of slider 30, thereby gap G does not contact recording layer 14b of disk 14. In other words, a predetermined head distance Ss is always maintained between gap G and layer 14b. Distance Ss is a sum of the distance S1 between flat surfaces 40a and 40b of slider 30 and the value S2 representing variances in the flatness of the disk surface. According to state-of-the-art machining techniques known such as etching, it is relatively easy to limit the distance S1 to be equal to or less than 0.08 μm. It is also easy to limit the maximum value of the variances in flatness of the disk surface to be within 0.02 μm or less. Therefore, the head distance Ss (as the sum of distances S1 and S2) can be limited to be within 0.1 μm or less. During operation of the magnetic disk device, i.e., rotation of disk 14, the two flat surfaces 40b of slider 30 of each head unit 20 are always in contact with disk 14. Head distance Ss does not vary significantly, even if disturbances such as vibrations act upon the magnetic disk device. Head distance Ss can be accurately limited to be 0.1 μm or less, and at the same time, variations in the distance Ss can be minimized. As a result, head unit 20 in the magnetic disk device can effectively perform vertically magnetized recording on the magnetic recording layer 14b of disk 14.

In the magnetic disk device of the present invention, since the pair of flat surfaces 40b of slider 30 of head unit 20 are always in contact with corresponding magnetic recording layer 14b of disk 14, wear of layer 14b must be taken into consideration. Assume that the area of the pair of flat surfaces 40b of slider 30 is, e.g., 8 mm$^2$, and that the force of leaf spring 42 acting on slider 30 is 16 g. A force acting on disk 14 is thus a maximum of about 2 g/mm$^2$. Since such a small force acts on disk 14, wear of recording layers 14b can be sufficiently minimized by forming lubricant layers 14c on the corresponding magnetic recording layers 14b of disk 14. Therefore, wear of the magnetic recording layers 14b does not pose any special problems in practice.

Figure 6:
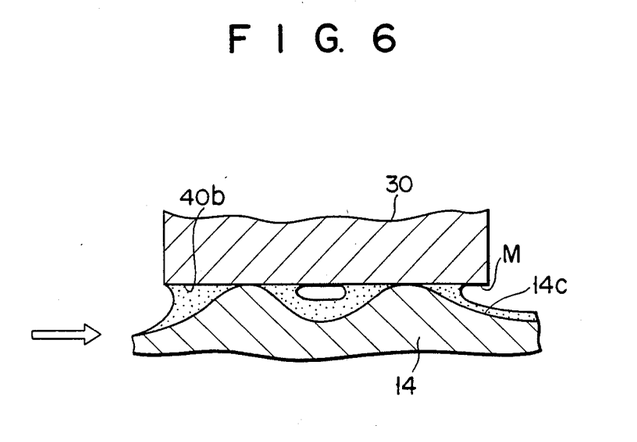
FIGS. 6 and 7 are respectively sectional views showing the effect of a lubricant applied to the magnetic disk.

As described above, the thickness of lubricant layer 14c is greater than the necessary clearance between the flat surface 40b of slider 30 and the recording layer 14b of disk 14. This is important. If the thickness is smaller than the clearance, meniscus M of layer 14c is formed between disk 14 and slider 30 as shown in FIG. 6. Meniscus M provides force attracting disk 14 to slider 30, and disk 14 is, so to speak, adhered to slider 30 by lubricant layer 14c during OFF operation of disk 14. If such is the case, a great force will act on head unit 20 and possibly damage unit 20 when motor 16 starts rotating disk 14.

Figure 7:
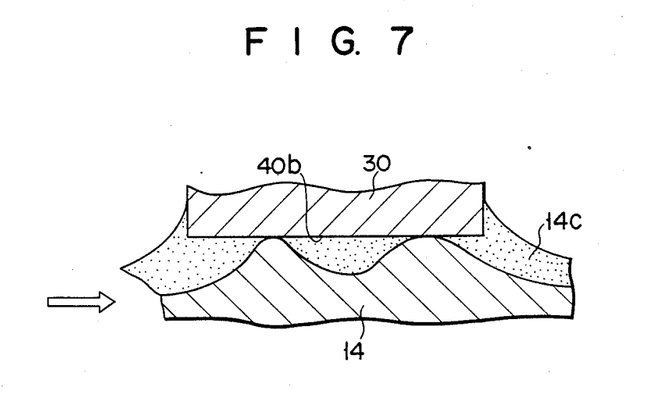

Since the thickness of lubricant layer 14c is larger than the maximum clearance, as in the first embodiment, meniscus M produced between disk 14 and slider 30 in head unit 20 can be prevented, as shown in FIG. 7, thereby eliminating the drawback caused by meniscus M.

Another means for minimizing wear of the magnetic recording layer 14b in disk 14 is to reduce the rotational speed of the disk 14. In this case, since the magnetic disk device can write data on the recording layer 14b of disk 14 according to the vertically magnetizing recording scheme, the memory capacity of disk 14 can be increased by several times at least compared with that of a disk which is written by the conventional in-plane recording method. Therefore, even if the rotational speed of disk 14 is reduced, the bit density of data recorded in recording layer 14b of disk 14 can be increased a satisfactory amount.

The present invention is not limited to the first embodiment as described above. The following embodiments may also be used. The same reference numerals as in the first embodiment denote the same parts in the following embodiments, therefore a detailed description thereof will be omitted.

Figure 8:
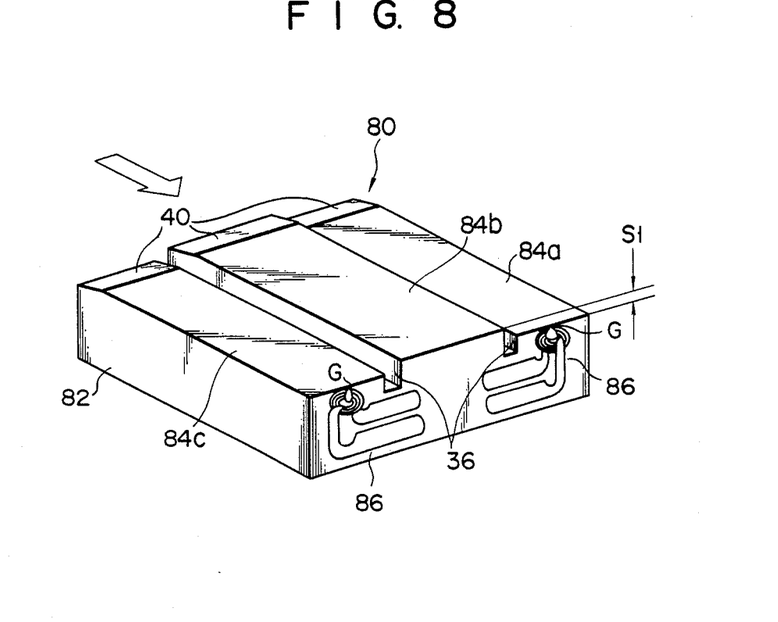
FIG. 8 is a perspective view of a slider according to a second embodiment of the present invention.

FIG. 8 shows head unit 80 according to the second embodiment of the present invention. Two grooves 36 are formed in slider 82 of the head unit 80 to define three projections 84a, 84b, and 84c, the same as in slider 30 of the first embodiment. The major differences between slider 82 of the second embodiment and slider 30 in FIG. 4 are in that the central projection 38b of as projections 38a and 38c of the head unit 20, and that projections 84a and 84c function as projection 38b of the head unit 20. Distance S1 is defined as being between the flat surface 40b of projection 84b and the flat surfaces 40a of projections 84a and 84c. In the head unit 80 according to the second embodiment, thin-film magnetic heads 86 are respectively provided on trailing surfaces of projections 84a and 84c. Magnetic gaps G of heads 86 are located on the same plane as the flat surfaces 40a of projections 84a and 84c.

Figure 9:
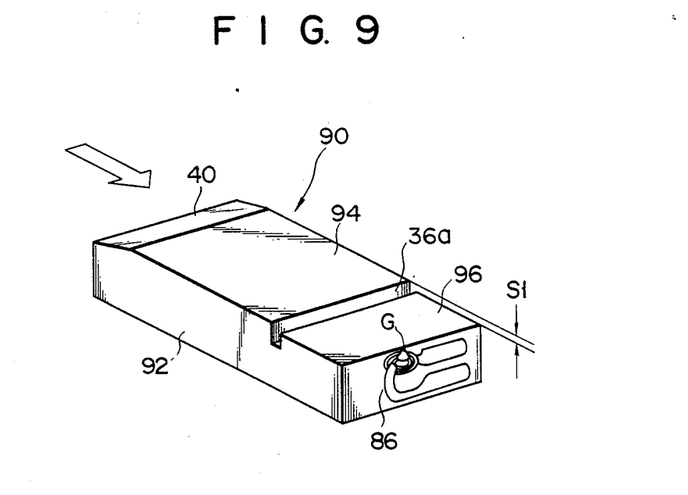
FIG. 9 is a perspective view of a slider according to a third embodiment of the present invention.

FIG. 9 shows head unit 90 according to the third embodiment of the present invention. Groove 36a is formed on slider 92 of head unit 90 and extends along a direction perpendicular to the rotational direction (indicated by the arrow in FIG. 9) of magnetic disk 14. Groove 36a divides the surface of slider 92 opposite disk 14 into two surfaces 94 and 96. Leading surface 94 viewed with respect to the rotational direction of disk 14 has an inclined surface 40. Trailing surface 96 is lower with respect to groove 36a than the leading surface 94 by distance S1. In the third embodiment, the leading surface 94 serves as a contacting surface relative to disk 14, as do surfaces 40b and 84b in the first and second embodiments. Trailing surface 96 has the same function as those of surfaces 40a and 84a. A thin-film magnetic head 86 is provided in head unit 90, as in the second embodiment. Head 86 is fixed on the trailing side of slider 92. The magnetic gap G of head 86 is located within the same plane as the lower surface 96.

Figure 10:
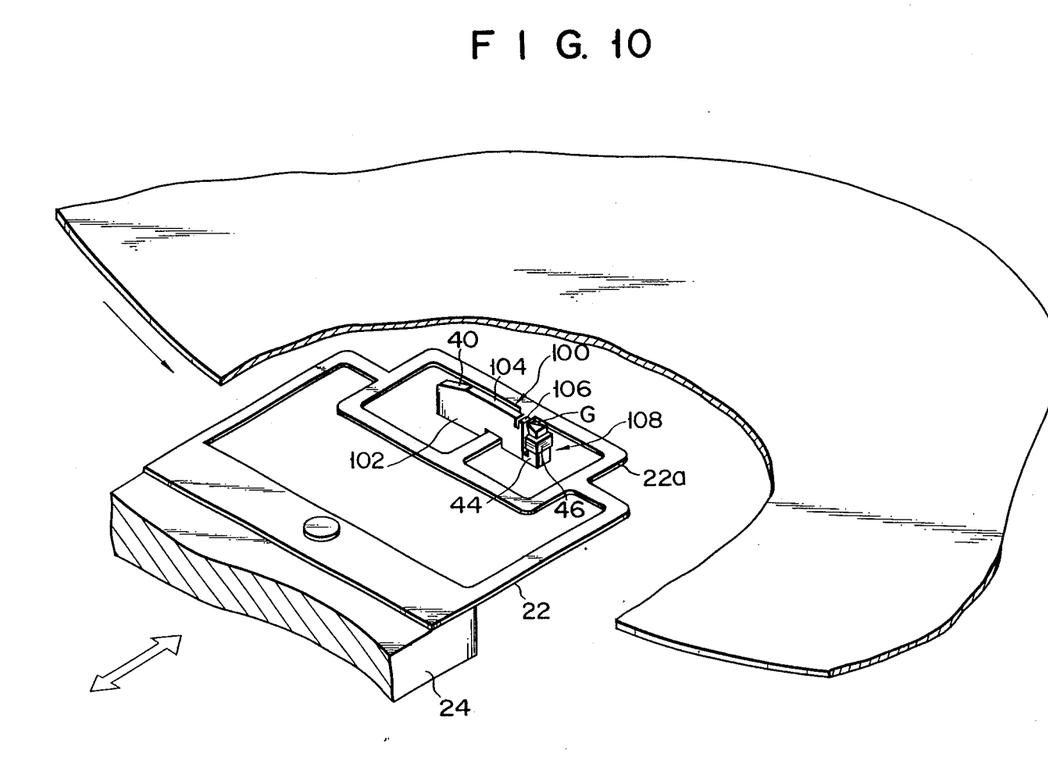
FIG. 10 is a perspective view showing a slider support mechanism according to a fourth embodiment of the present invention.
Figure 11:
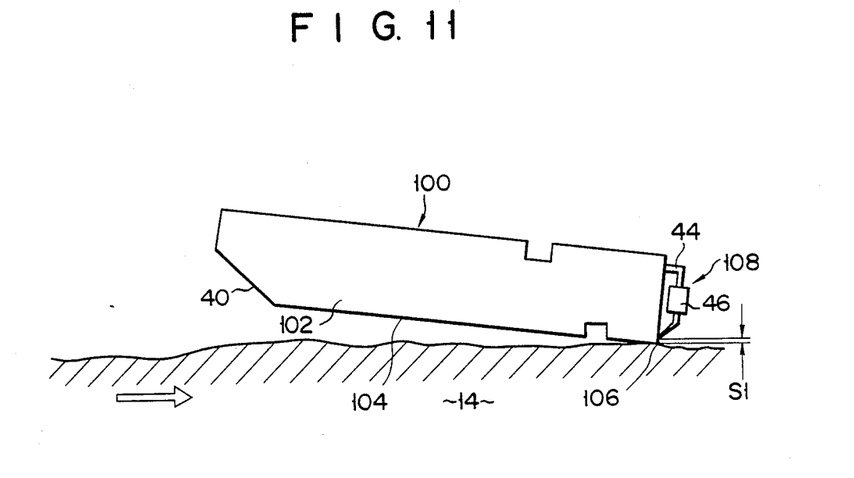
FIG. 11 is a side view of the slider in FIG. 10.
Figure 12:
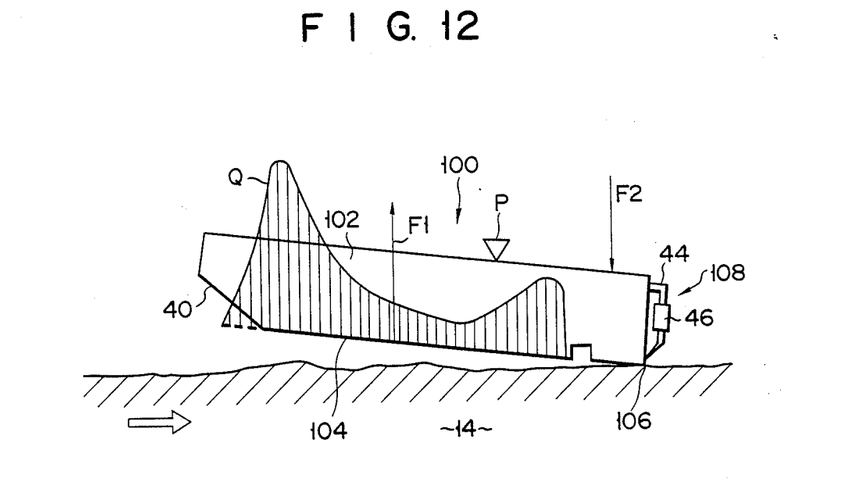
FIG. 12 is a side view showing a state wherein a force acts on the slider in FIG. 10.

FIGS. 10 to 12 show head unit 100 according to the fourth embodiment of the present invention. Slider 102 of head unit 100 has a small width. Slider 102 has groove 36a in its surface across its width the same as does slider 92. Groove 36a divides slider 102 into two surfaces, 104 and 106. Leading surface 104 includes inclined edge 40 located at the leading side of slider 102 when viewed with respect to the rotational direction of disk 14. Trailing surface 106 is located at the trailing side of slider 102 when viewed with respect to the rotational direction of disk 14. The area of trailing surface 106 is sufficiently smaller than that of the leading surface 104. In this embodiment, trailing surface 106 is inclined at a predetermined angle so that the leading edge of surface is farther from disk 14 than the trailing edge of the same surface. Slider 102 is supported by gimbal spring 22a of gimbal arm 22 in the same manner as in the previous embodiments. The pivotal point of slider 102 with respect to gimbal spring 22a deviates from the longitudinal center of slider 102 to a position near surface 106, as shown in FIG. 12.

In the fourth embodiment, a magnetic head 108 is attached to the trailing face of slider 102. Head 108 has substantially the same structure as head 32, except that the magnetic gap G of head 108 is displaced from the trailing surface 106 by distance S1 from disk 14. Distance S1 can be accomplished by means of etching.

According to the fourth embodiment of the present invention, the surface of slider 102 opposite disk 14, i.e., the leading surface 104 of slider 102, receives dynamic pressure Q generated by an airflow when disk 14 rotates. The magnitude of the dynamic pressure Q along the longitudinal direction of leading surface 104 is represented by the hatched region in FIG. 12, using leading surface 104 as a reference. The center of the dynamic pressure Q acting on leading surface 104 is represented by point A in FIG. 12. Point A is closer to the inclined surface 40 than pivot point P is.

When the dynamic pressure Q acts on slider 12 upon rotation of disk 14, force F1 acts on point A of the slider 102 so as to lift slider 102 from the magnetic disk 14. Since point A deviates from point P, a rotational force acts on slider 102 so as to rotate it about point P. As a result, as shown in FIGS. 11 and 12, trailing surface 106 located at the trailing side of slider 102 (when viewed with respect to the rotational direction of disk 14) is urged against the magnetic recording surface 14b of disk 14 by a predetermined force, i.e., force F2 producing the same magnitude at that moment as that of force F1, but acting in an opposite direction. Therefore, slider 102 is kept in contact with disk 14 through trailing surface 106, during the rotation of disk 14. Since the distance S1 is assured between the trailing surface 106 and the magnetic gap G of head 108, a constant distance of 0.1 μm or less is defined between the magnetic recording layer 14b of disk 14 and the magnetic gap G of the magnetic head 108 during operation, as is in the magnetic disk devices of the previous embodiments. Therefore, the data recording density of recording layer 14b of disk 14 can be increased.

Since the contact area between disk 14 and trailing surface 106 of slider 102 is small, slider 102 can be slid on disk 14 while the slider 102 follows the contour of the disk. As a result, the distance between the magnetic gap G of the magnetic head 108 and the magnetic recording layer 14b of the magnetic disk 4 can be more accurately controlled.

According to the fourth embodiment, dynamic pressure Q acting on slider 102 is utilized to urge trailing surface 106 of the slider 102 against the disk 14. Unlike as is in the first embodiment, the leaf spring for causing gimbal spring 22a to bias slider 102 against magnetic disk 14 is unnecessary.

What is claimed is:

1. A magnetic head device used with a rotatable disk of a rigid type, which has a magnetic recording surface on at least one side surface thereof and which rotates in one direction, comprising:
    a slider having a flat surface which faces the magnetic recording surface of the rotatable disk and which extends in a tangential direction with respect to said disk when said slider is located adjacent the periphery of the rotatable disk, and having a trailing end face extending perpendicular with respect to the recording surface of the rotatable disk, and further having a support surface opposite the flat surface;
    support/drive means for elastically supporting the slider such that the slider is movable at least in a direction perpendicular to the rotatable disk, and for moving the slider in the radial direction of the disk;
    floating means for applying a floating force to the slider to float the same above the magnetic recording surface of the rotatable disk when the disk is rotating, said floating means including at least one air bearing surface formed on the flat surface of said slider, and at least one tapered surface defined at a leading portion of the air bearing surface with respect to the rotational direction of the rotatable disk, said tapered surface being slanted in a direction away from the magnetic surface;
    urging means for rotatively urging said slider so as to bring a trailing portion of the air bearing surface of the floating means, toward and in contact with the magnetic recording surface of the disk when said disk is rotating such that said slider receives the floating force produced by said floating means; and
    a magnetic head provided on the trailing end face of the slider, and having a magnetic gap to perform data read and write operations on the magnetic recording surface of the rotatable disk, the magnetic gap being spaced apart from the trailing portion of the air bearing surface by a predetermined distance in a direction, perpendicular to the recording surface of the disk.

2. A device according to claim 1, wherein
    said support/drive means includes an access arm for reciprocating in the radial direction of the magnetic disk, and a gimbal mechanism having a leaf spring and attached to the access arm, said gimbal mechanism pivotally supporting the slider at a predetermined support point in a surface located opposite to the air bearing surface; and
    said urging means deviates the support point away from the center of the floating force acting upon the slider towards the trailing end face of the slider.

3. A device according to claim 2, wherein said slider has a dividing groove formed in the air bearing surface for diving the same into the leading portion and a trailing portion, said dividing groove being located closer to the trailing end face of the slider than the support point in the support surface of said slider.

4. A device according to claim 3, wherein the trailing portion of the air bearing surface of the slider has a surface inclined with respect to the magnetic recording surface of the disk, a distance between the inclined surface of the trailing portion and the magnetic recording surface becoming greater toward the dividing groove.

5. A device according to claim 3, wherein the trailing portion of the air bearing surface is displaced further than the leading portion of the air bearing surface towards the support surface.

6. A device according to claim, wherein a pair of grooves which are parallel to each other are formed on said air bearing surface and said tapered surface from the trailing end face to an end face opposite thereto, thereby dividing into three sections, both said air bearing surface and said tapered surface.

7. A device according to claim 6, wherein of the three sections of the air bearing surface, one of the sections located between the other two sections is displaced further than the other two sections towards the support surface in a direction away from the magnetic disk, and a magnetic gap of the magnetic head is located adjacent said one section and the trailing end face.

* * * * *